(12) United States Patent
Kato et al.

(10) Patent No.: US 6,217,251 B1
(45) Date of Patent: Apr. 17, 2001

(54) JOINING STRUCTURE FOR JOINING ADJACENT MEMBERS

(75) Inventors: Rentaro Kato; Koji Uchino; Yuichi Ogawa, all of Kasugai; Masaharu Tochigi, Tochigi; Naoyuki Kawata, Tochigi; Naoki Nishikawa, Tochigi, all of (JP)

(73) Assignees: Tokai Rubber Industries, Ltd.; Showa Aluminum Corporation, both of Osaka (JP)

( * ) Notice: Subject to any disclaimer, the term of this patent is extended or adjusted under 35 U.S.C. 154(b) by 0 days.

(21) Appl. No.: 09/212,008

(22) Filed: Dec. 15, 1998

(30) Foreign Application Priority Data

Dec. 16, 1997 (JP) .................................................. 9-346296

(51) Int. Cl.[7] .................................................. F16B 1/00
(52) U.S. Cl. .......................................... 403/341; 403/364
(58) Field of Search .................................. 403/341, 293, 403/292, 294, 364, 381, 353

(56) References Cited

U.S. PATENT DOCUMENTS

| | | | |
|---|---|---|---|
| 1,171,589 | * | 2/1916 | Brownfield .......................... 403/381 |
| 2,817,620 | * | 12/1957 | Golick et al. ..................... 403/292 X |
| 3,489,987 | * | 1/1970 | Niskin ............................. 403/341 X |
| 4,019,298 | * | 4/1977 | Johnson, IV ..................... 403/381 X |
| 4,154,545 | * | 5/1979 | Pinto et al. ...................... 403/341 X |
| 4,416,563 | * | 11/1983 | Zemke et al. .................... 403/341 X |
| 4,648,738 | * | 3/1987 | Thielen ................................. 403/341 |
| 4,710,052 | * | 12/1987 | Elger ................................ 403/341 X |
| 4,854,665 | * | 8/1989 | Gagnon ............................ 403/341 X |
| 5,098,216 | * | 3/1992 | Caperton .............................. 403/341 |
| 5,136,755 | * | 8/1992 | Shaw ................................ 403/275 X |
| 5,143,477 | * | 9/1992 | Kanehira et al. .................... 403/341 |
| 5,149,108 | * | 9/1992 | Leiszter ........................... 403/364 X |
| 5,269,572 | * | 12/1993 | Mefferd ............................ 403/341 X |
| 5,396,963 | * | 3/1995 | Curry ............................... 403/381 X |
| 5,499,883 | * | 3/1996 | Heinzel .............................. 43/341 X |
| 5,588,726 | * | 12/1996 | Lee .................................. 403/231 X |
| 5,642,957 | * | 7/1997 | Lange ............................... 403/292 X |
| 5,664,793 | * | 9/1997 | Engibarov ........................ 403/381 X |

* cited by examiner

*Primary Examiner*—Lynne H. Browne
*Assistant Examiner*—John R. Cottingham

(57) ABSTRACT

A joining structure for joining adjacent members includes a first member and a second member. One end portion of the first member is joined to one end portion of the second member such that protruded portions formed on the one end portion of the first and second members are engaged with corresponding dented portions formed on one end portion of the second and first members, respectively. A hollow joining member is fitted on a joined portion of said first and second members and crimped on the joined portion.

19 Claims, 5 Drawing Sheets

JOINING STRUCTURE FOR JOINING ADJACENT MEMBERS

BACKGROUND OF THE INVENTION

1. Field of the Invention

The present invention relates to a joining structure for joining adjacent members, more particularly, to a joining structure for joining end portions of adjacent members in the field of manufacturing automobile parts such as suspension arms, building materials such as beams, or the like.

2. Related Art

Conventionally, there have been various methods for joining end portions of adjacent metal members. Examples of such methods include a welding method such as a TIG welding (tungsten-inert-gas arc welding) or a MIG welding (metal electrode inert gas welding), a solid-phase joining method such as a friction agitation joining method, and a fit-and-engage method in which end portions of adjacent members are fitted and engaged to join the members.

However, the welding method and the friction agitation joining method cause less tensile strength, i.e., less coupling efficiency, due to heat generated during the welding or joining. Further, according to these methods, the joining portions should be welded or joined around the whole circumference thereof, which takes time and cost. According to the e fit-and-engage method, there may be a possibility that water or the like sinks into the joined portion to cause crevice corrosion, thereby resulting in poor corrosion resistance.

SUMMARY OF THE INVENTION

It is an object of the present invention to provide a joining structure for joining adjacent members, which is superior in high tensile strength and corrosion resistance and enables a quick joining with low cost.

According to the present invention, a joining structure for joining adjacent members includes a first member having a protruded portion and a dented portion at one end portion of the first member, a second member having a protruded portion and a dented portion at one end portion of the second member, and a hollow joining member. The one end portion of the first member is joined to the one and portion of the second member such that the protrusions of the first and second members are engaged with the dented portions of the second and first members, respectively, and the hollow joining member is fitted on a joined portion of the first and second members and crimped on the joined portion to integrally join the first and second members.

According to the joining structure, not only the joined portion is crimped, but also the hollow joining member disposed on the outer surface of the joined portion is crimped. Therefore, the joined portion having superior tensile strength can be obtained. Since the first and second members can be securely joined when the end portions of the first and second members are engaged with each other and the hollow joining member disposed on the joined portion is crimped, the joining process can be easily and quickly performed with low cost.

In the joining structure for joining adjacent members, if the hollow joining member is disposed so that the hollow joining member covers the joined portion, there is no possibility that water or the like sinks into the joined portion to cause crevice corrosion, thereby resulting in excellent corrosion resistance.

Further, if outer surfaces of the protrusions and/or an inner surface of the hollow joining member are roughened and the hollow joining member is crimped via the roughened surfaces, a joined portion becomes superior in tensile strength because of the synergistic effect of the roughened surface and the crimping.

Furthermore, if the protrusions have grooves on opposed surfaces thereof and an intervening member is disposed in the grooves, the intervening member anchors the arm members, whereby the joined portion becomes superior in tensile strength.

Other objects and the features will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

Figures 1A, 1B:
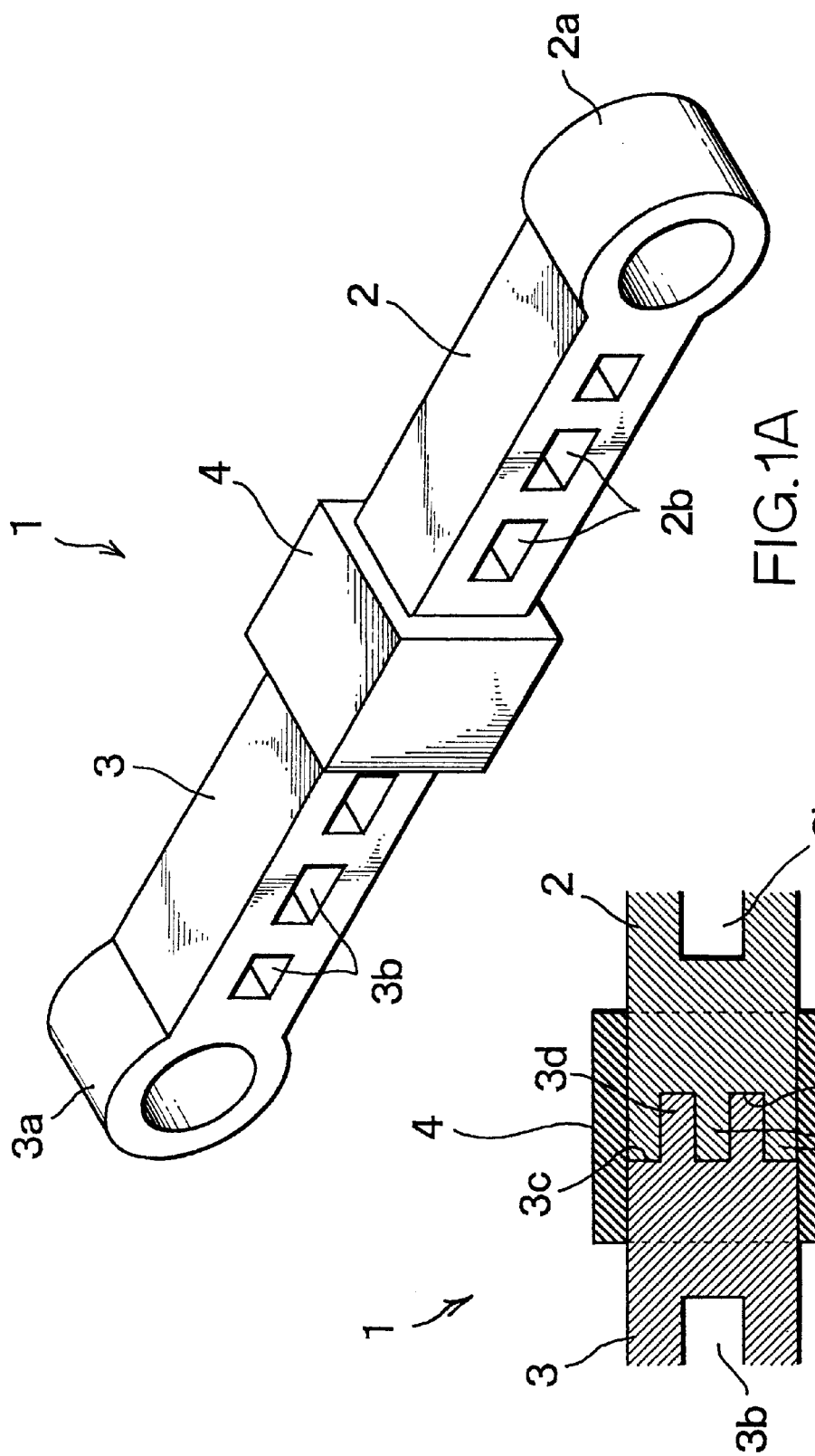
FIG. 1A is a perspective view of a suspension arm according to the first embodiment of the present invention.
FIG. 1B is a cross-sectional view of the joined portion of the suspension arm shown in FIG. 1A.
Figure 2:
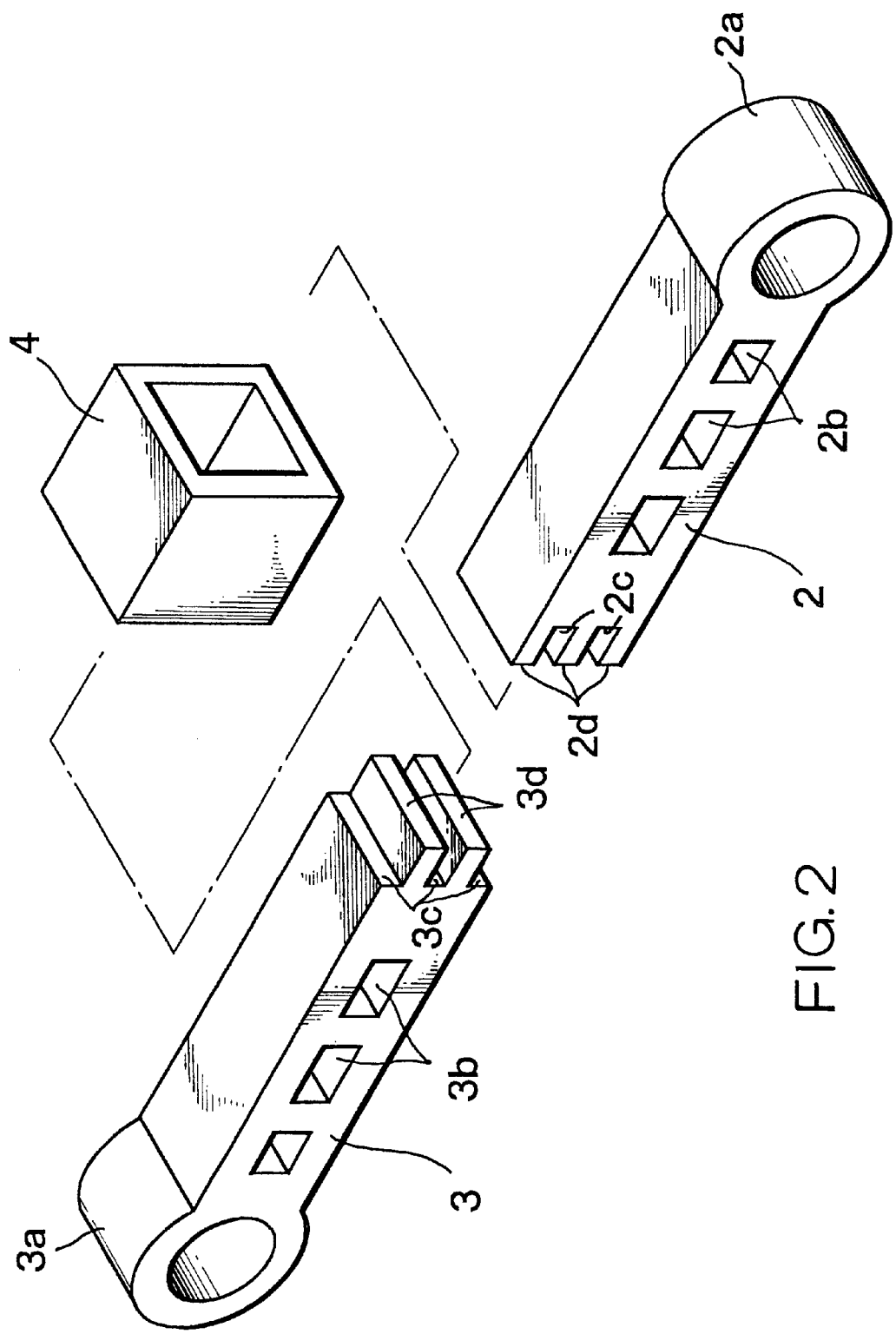
FIG. 2 is a perspective view of the suspension arm shown in FIG. 1A in a disassembled state.

FIGS. 1 and 2 show a joining structure of a suspension arm 1, as one of automobile parts, according to the first embodiment of the present invention.

The suspension arm 1 includes a first arm member 2 having an arm portion and a boss 2a at one end of the arm portion, and a second arm member 3 having an arm portion and a boss 3a at one end of the arm portion. The arm members 2, 3 are joined at their ends.

The following construction is employed for joining the ends of the arm members 2, 3. Each of the arm member 2, 3 is manufactured by cutting an extruded article made of JIS (Japanese Industrial Standard) A6061 aluminum to have a predetermined thickness. The arm portion has a plurality of transversely penetrated hollow portions 2b, 3b which are formed when the arm members 2, 3 are extruded. On the joining end of each arm member 2, 3, protruded portions 2d, 3d and dented portions 2c, 3c are provided for joining the arm members 2, 3.

As shown in FIGS. 1B and 2, on the joining end of the first arm member 2, an upper and lower channel shaped dented portions 2c, 2c are formed at a certain interval, whereby a total of three protruded portions 2d, 2d, 2d are formed. On the joining end of the second arm member 3, an upper and lower protruded portions 3d, 3d, which corresponds to the dented portions 2c, 2c of the first arm member 2, are formed, whereby a total of three dented portions 3c, 3c, 3c are formed. The protruded portions 3d, 3d of the second arm member 3 is to be fitted in the dented portions 2a, 2c of the first arm member 2.

When joining the arm members 2, 3, a hollow joining member 4 is used. The hollow joining member 4 is manufactured by cutting an extruded hollow article to have a certain length. The hollow joining member 4 is made of materials such as JIS A6063 aluminum or the like, which is softer than the materials of the arm members 2, 3. The hollow joining member 4 has a hollow portion having a transverse cross-sectional shape and dimensions corresponding to those of each arm portion of the arm members 2, 3. The hollow joining member 4 is designed to have such a length that the hollow joining member 4 can cover the engaged portions of the arm members 2, 3.

Now, the joining process for joining the arm members 2, 3 will be described as follows.

First, the hollow joining member 4 is fitted on one of the arm members 2, 3. Then, the joining end portion of one of the arm members 2, 3 is engaged with the joining end portion of the other of the arm members 2, 3 so that the protruded portions 2d, 3d are fitted in the dented portions 2c, 3c. Thereafter, the hollow joining member 4 is slid so as to cover the joined portion of the arm members 2, 3. Finally, the hollow joining member 4 is crimped on the joined portion of the arm members 2, 3, whereby the arm members 2, 3 are integrally joined with each other to form a suspension arm 1, According to the joining structure mentioned above, the protruded portions 2d, 3d are fitted in the corresponding dented portions 2c, 3c, and the hollow joining member 4 is crimped on the joined portion of the arm members 2, 3. Therefore, the opposed surfaces of the adjacent protruded portions 2d, 3d of the arm members 2, 3 are closely adhered with each other by the crimping of the hollow joining member 4. Further, the inner surface of the hollow joining member 4 is closely adhered to the outer surface of the joined portion of the arm members 2, 3, thereby the arm members 2, 3 are assuredly joined by the frictional engaging function. Therefore, the joined portion becomes superior in tensile strength.

The joining process can be performed in a simple manner such that the hollow joining member 4 is fitted on one of the arm members 2, 3, and the end portions of the arm members 2, 3 are engaged with each other, and the hollow joining member 4 is crimped on the joining portion of the arm members 2, 3. Thus, the joining of the arm members 2, 3 can be easily and quickly performed with low cost.

Further, since the joined portion of the arm members 2, 3 are covered by the hollow joining member 4 to shut out from outside air, there is no possibility that water or the like sinks into the joined portion to cause crevice corrosion, thereby resulting in excellent corrosion resistance.

Further, in the above embodiment, the materials of the hollow joining member 4 is softer than that of the arm members 2, 3 so that the hollow joining member 4 can be crimped. This can prevent the joined portion of the arm members 2, 3 from being unintentionally excessively deformed.

Further, in the above embodiment, since the arm members 2, 3 are formed by extrusion, the protruded portions 2d, 3d and the dented portions 2c, 3c can integrally be formed when the arm members are extruded. Thus, the joined member can easily be manufactured in a simple manner.

Figure 3A:
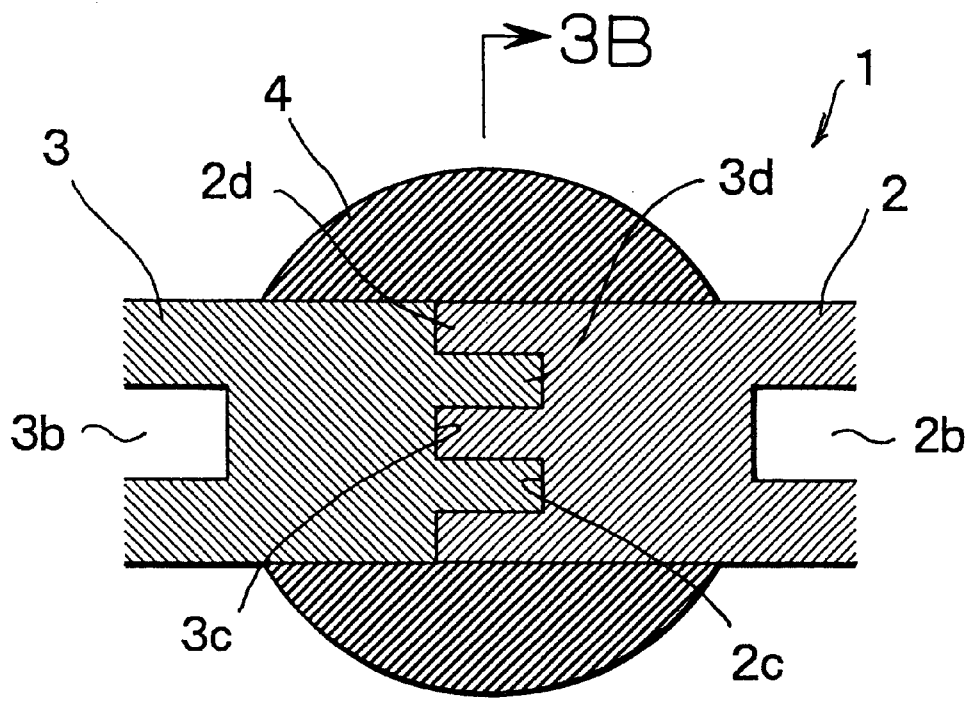
FIG. 3A is a cross-sectional view of a suspension arm according to the second embodiment of the present invention.
Figure 3B:
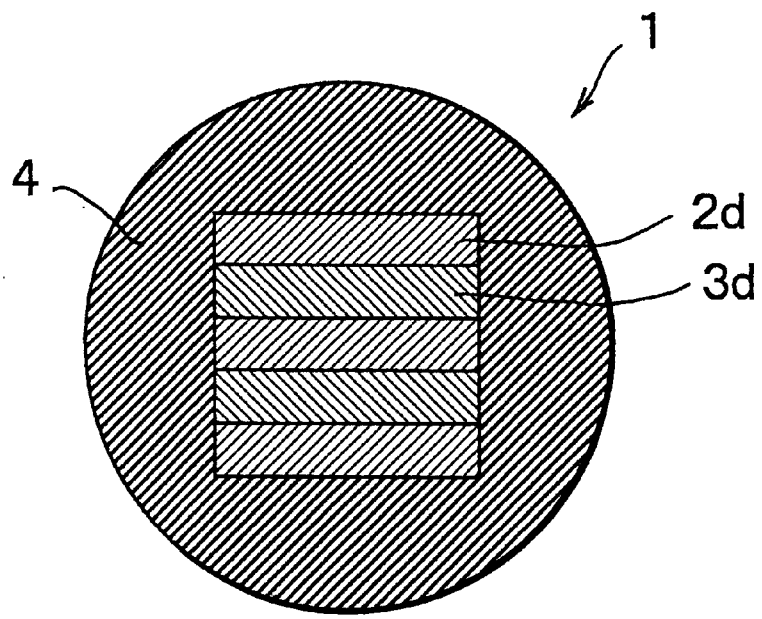
FIG. 3B is a cross-sectional view taken along the lines 3B—3B in FIG. 3A.

FIG. 3A shows a cross-sectional view of the joined portion according to the second embodiment of the present invention. In the embodiment, the hollow joining member 4 is formed to have a spherical shape. The hollow joining member 4 is made of a metal such as aluminum or aluminum alloys, and has a penetrated hollow portion for fitting the arm members 2, 3. In this embodiment, since the hollow joining member 4 is formed to have a spherical shape, the joined portion of the arm members 2, 3 does not have any protruded sharp portions. This enhances easy and safety handling of the joined member, and improves the appearance.

Figure 4:
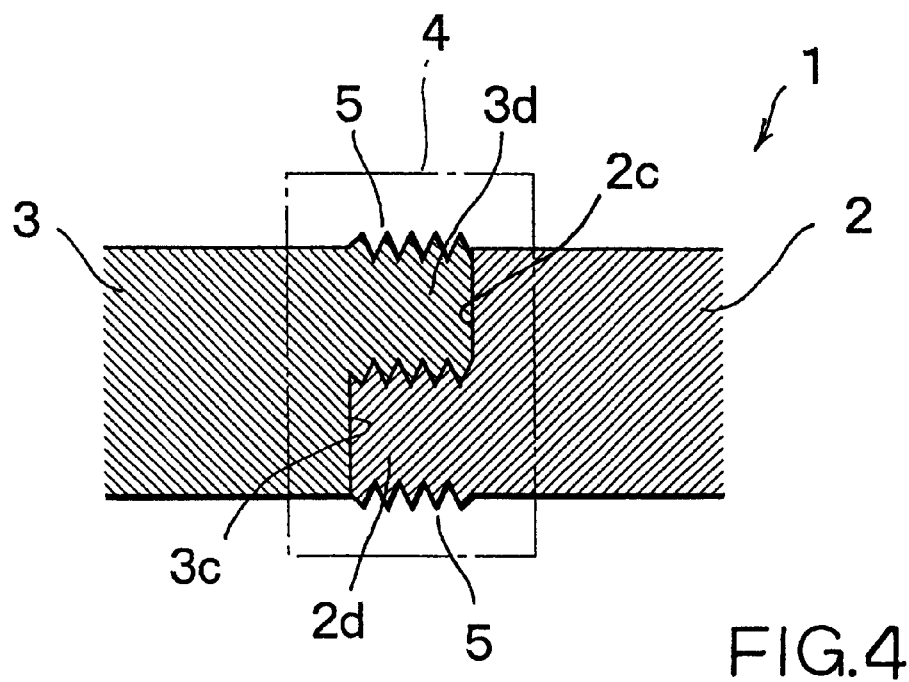
FIG. 4 is a cross-sectional view of the joined portion according to the third embodiment of the present invention.

FIG. 4 shows a cross-sectional view of the joined portion according to the third embodiment of the present invention. In this embodiment, on the opposed surfaces of the protruded portions 2d, 3d of the arm members 2, 3 and the outer surfaces of the protruded portions 2d, 3d opposed to the inner surface of the hollow joining member 4, an uneven surface 5 is formed by extrusion, respectively. The hollow joining member 4 is made of materials softer than the materials of the arm members 2, 3. Therefore, the opposed uneven surfaces of the protruded portions 2d, 3d are engaged, and the inner surface of the hollow joining member 4 is engaged with the uneven outer surfaces of the protruded portions 2d, 3d. This results in a strong joint. Further, the uneven surfaces 5 can be formed when the arm members 2, 3 are formed by extrusion.

Figure 5:
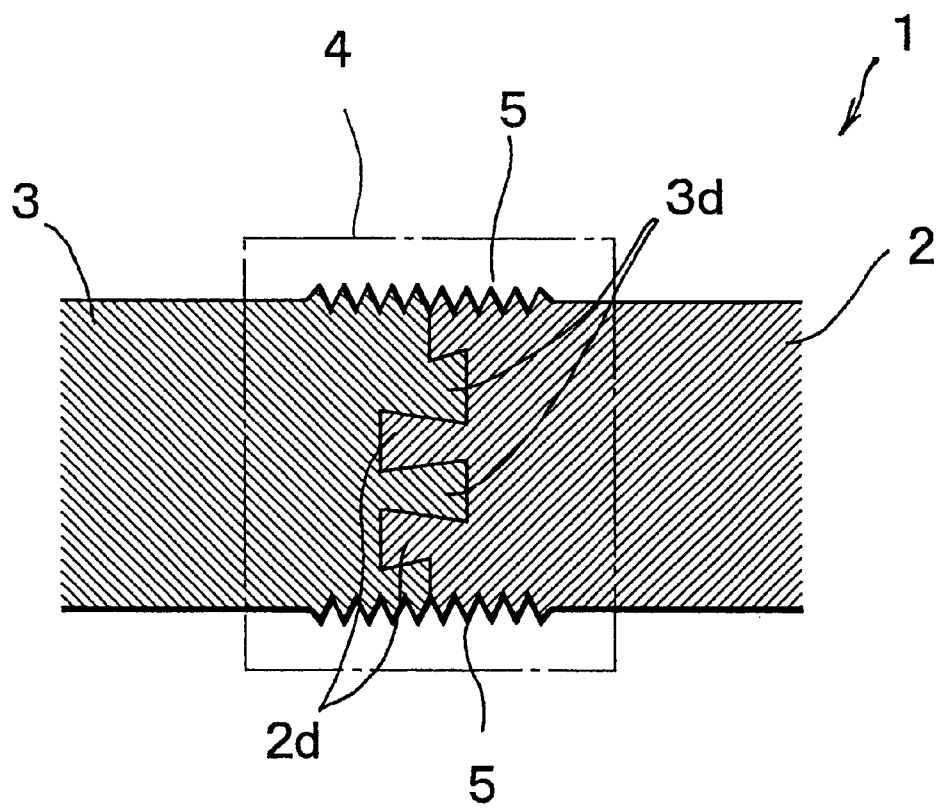
FIG. 5 is a cross-sectional view of the joined portion according to the fourth embodiment of the present invention.

FIG. 5 shows a cross-sectional view of the joined portion according to the fourth embodiment of the present invention. In the embodiment, each arm member 2, 3 is formed by extrusion to have protruded portions 2d, 3d each having thickness reducing toward its basal end, and dented portions each corresponding to the corresponding protruded portions 2d, 3d. The protruded portions 2d, 3d of the first and second arm members 2, 3 are engaged with the corresponding dented portions of the second and first arm members 3, 2, respectively. On the outer surfaces of the joining portion of each arm member 2, 3, uneven surfaces 5 are formed by extrusion. The hollow joining member 4 is made of materials softer than the materials of the arm members 2, 3. Thus, the engaged protruded portions 2d, 3d can provide a strong coupling, and the inner surface of the hollow joining member 4 is engaged with the uneven outer surfaces of the joining portions to provide a strong joined portion.

Figures 6A, 6B:
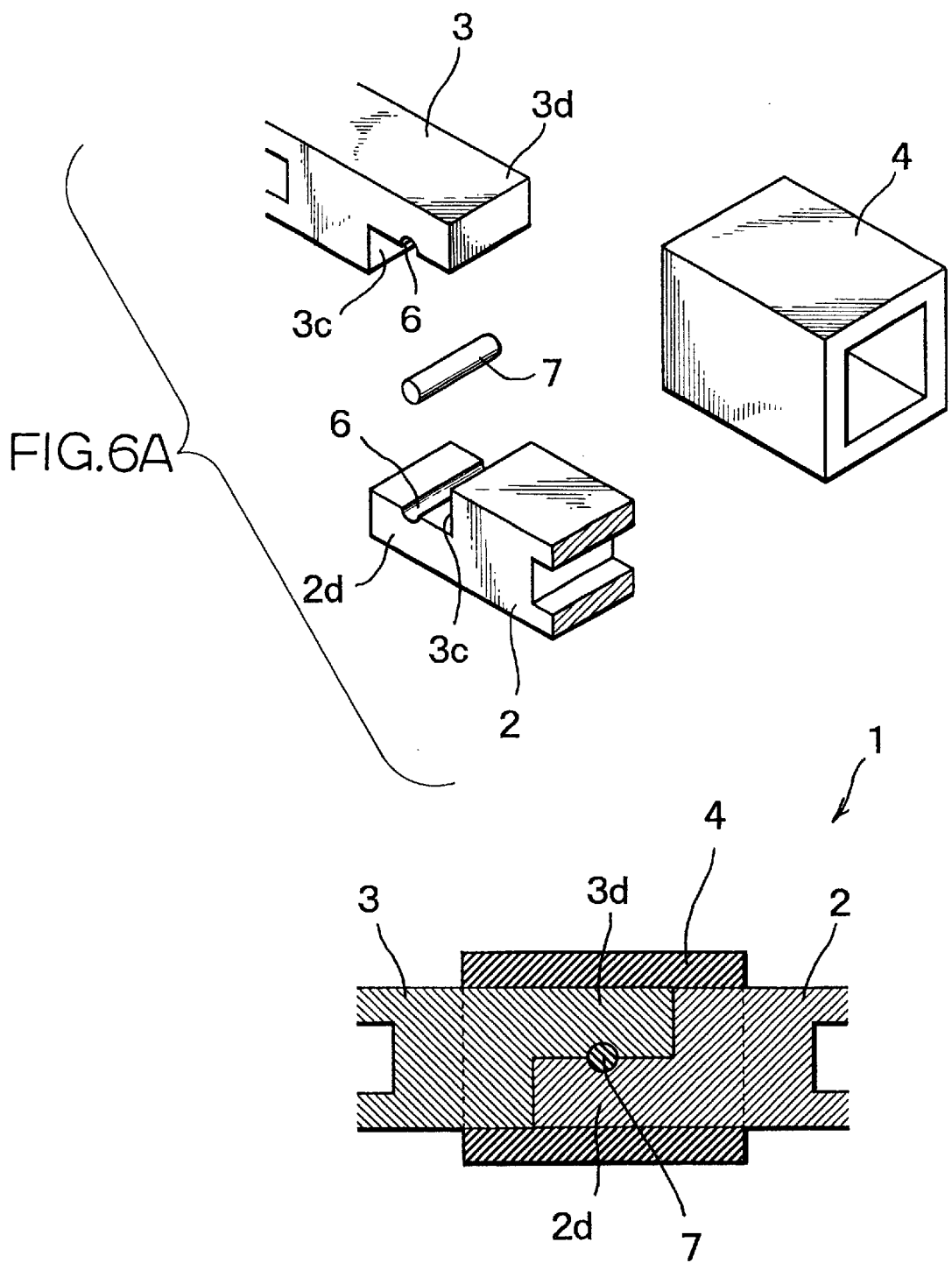
FIG. 6A is a perspective view of the joining members in a disassembled state according to the fifth embodiment of the present invention.
FIG. 6B is a longitudinal cross-sectional view of the joined portion.

FIGS. 6A and 6B show the fifth embodiment of the present invention. In the embodiment, each arm member 2, 3 has a stepped end portion 2d, 3d having a groove 6 on the stepped surface. The groove 6 is integrally formed when the arm members 2, 3 are extruded. As shown in FIG. 6B, the stepped end portions 2d, 3d are fitted with each other. In the fitted state, a pin-shaped or wire-shaped stainless intervening member 7 is disposed in the grooves 6, 6. The intervening member 7 anchors the arm members 2, 3 when the hollow joining member 4 is fitted on the joined portion of the arm members 2, 3, whereby an engaged joined portion becomes superior in tensile strength. The groove 6 can easily be formed when the arm members 2, 3 are extruded.

Though the embodiments have been described as mentioned above, the present invention is not limited to the joined structure which is used to join the first arm member 2 and the second arm member 3 of the suspension arm 1. The present invention can be widely applied when end portions of various kinds of members are joined.

In the above embodiments, though the joining member is formed by extruding aluminum or aluminum alloys, the joining member is not limited to such an extruded article, and may be made of various materials such as a metal other than aluminum or aluminum alloys, woody materials, or synthetic resins.

In the above embodiments, though the surfaces of the protruded portions 2d, 3d or the stepped ends 2d, 3d are roughened, the inner surface of the hollow joining member 4 may be roughened. In this case, only the inner surface of the hollow joining member 4 may be roughened, or both of the inner surface of the hollow joining member 4 and the outer surface of the protruded portions 2d, 3d of the arm members 2, 3 may be roughened.

Further, in the above embodiments, though the hollow joining member 4 is made of materials softer than the materials of the arm members 2, 3, the hollow joining member 4 may be made of materials harder than the materials of the arm members 2, 3, or may be made of materials which has hardness equal to the hardness of the materials of the arm members 2, 3 regardless of the existence of the roughened surface.

According to the present invention, a joining structure for joining adjacent members includes a first member having a protruded portion and a dented portion at one end portion of the first member, a second member having a protruded portion and a dented portion at one end portion of the second member, and a hollow joining member. The one end portion of the first member is joined to the one end portion of the second member such that the protruded portions of the first and second members are engaged with the dented portions of the second and first members, respectively, and the hollow joining member is fitted on a joined portion of the first and second members and crimped on the joined portion to integrally join the first and second members. Therefore, the joined portion having superior tensile strength can be obtained. Further, since joining process can be preformed by engaging the joining portions and crimping the hollow joining member disposed on the outer surface of the joined portion, the joining can be easily and quickly performed with low cost.

If the hollow joining member is disposed so that the hollow joining member covers the joined portion, there is no possibility that water or the like sinks into the joined portion to cause crevice corrosion, thereby resulting in excellent corrosion resistance.

Further, if outer surfaces of the protruded portions and/or an inner surface of the hollow joining member are roughened and the hollow joining member is crimped via the roughened surfaces, the joined portion having superior tensile strength can be obtained because of the synergistic effect of the roughened surface and the crimping.

Furthermore, if the protruded portions have grooves on the opposed surfaces of the protruded portions and an intervening member is disposed in the grooves, the intervening member anchors the arm members, whereby an engaged joined portion superior in tensile strength can be obtained.

This application claims priority to Japanese Patent Application No. H9(1997)-346296 filed on Dec. 16, 1997, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A joining structure for joining adjacent members, comprising:

a first member having a protruded portion and a dented portion at one end portion of said first member;

a second member having a protruded portion and a dented portion at one end portion of said second member; and a hollow joining member, wherein each of said first and second members is obtained by cutting an extruded article in a plane perpendicular to an extruding direction of said extruded article so as to have a certain width, each of said first and second members being non-circular in cross-section, wherein said one end portion of said first member is joined to said one end portion of said second member such that said protruded portions of said first and second members are engaged with said dented portions of said second and first members, respectively, wherein said hollow joining member is fitted on a joined portion of said first and second members such that said hollow joining member extends over said first and second members and conceals said protruded portions and said dented portions, and wherein said hollow joining member is crimped together with said joined portion to integrally join said first and second members in a state that said joined portion includes no hollow portion therein.

2. The joining structure for joining adjacent members as recited in claim 1, wherein at least one of an outer surface of said joined portion and an inner surface of said hollow joining member are roughened, and said hollow joining member is crimped via said roughened surfaces.

3. The joining structure for joining adjacent members as recited in claim 1, further comprising an intervening member, wherein said protruded portions have grooves on opposed surfaces of said protruded portions, and said intervening member is disposed in said grooves.

4. The joining structure for joining adjacent members as recited in claim 3, wherein said intervening member is a pin or a wire made of metal or stainless steel.

5. The joining structure for joining adjacent members as recited in claim 1, further comprising an intervening member, wherein at least one of an outer surface of said joined portion and an inner surface of said hollow joining members are roughened, wherein said protruded portions have grooves on opposed surfaces thereof, and wherein said intervening member is disposed in said grooves, and wherein said hollow joining member covers said joined portion and is crimped via said roughened surfaces.

6. The joining structure for joining adjacent members as recited in claim 1, wherein at least one of said first member, said second member and said hollow joining member are made of aluminum or aluminum alloys.

7. The joining structure for joining adjacent members as recited in claim 1, wherein said hollow joining member is made of materials softer than the materials of said first member and said second member.

8. The joining structure for joining adjacent members as recited in claim 1, wherein said hollow joining member is a metal spherical member having a penetrated hole for inserting said first member and said second member.

9. The joining structure for joining adjacent members as recited in claim 1, wherein said protruded portion is formed to have a thickness reducing toward a basal end of said protruded portion, and said dented portion is formed to have a width increasing toward a bottom end of said dented portion.

10. The joining structure for joining adjacent members as recited in claim 1, wherein said protruded portion is formed to have a thickness reducing toward a basal end of said protruded portion, and said dented portion is formed to have a width increasing toward a bottom end of said dented portion, wherein at least one of an outer surface of said joined portion and an inner surface of said hollow joining member are roughened, and wherein said hollow joining member is crimped via said roughened surfaces.

11. A joining structure for joining adjacent members, comprising:
- a first member having a protruded portion and a dented portion at one end portion of said first member;
- a second member having a protruded portion and a dented portion at one end portion of said second member; and
- a hollow joining member;
- wherein said one end portion of said first member is joined to said one end portion of said second member such that said protruded portions of said first and second members are engaged with said dented portions of said second and first members, respectively;
- wherein at least one of an outer surface of said joined portion and an inner surface of said hollow joining member are roughened;
- wherein said hollow joining member is fitted on a joined portion of said first and second members such that said hollow joining member extends over said first and second members and conceals said protruded portions and said dented portions, and
- wherein said hollow joining member is crimped together with said joined portion via said roughened surfaces to integrally join said first and second members in a state that said joined portion includes no hollow portion therein.

12. The joining structure for joining adjacent members as recited in claim 11, further comprising an intervening member, wherein said protruded portions have grooves on opposed surfaces thereof, and said intervening member is disposed in said grooves.

13. The joining structure for joining adjacent members as recited in claim 12, wherein said intervening member is a pin or a wire made of metal or stainless.

14. The joining structure for joining adjacent members as recited in claim 11, wherein at least one of said first and second members and said hollow joining member are made of aluminum or aluminum alloys.

15. The joining structure for joining adjacent members as recited in claim 11, wherein at least one of said first and second members and said hollow joining member are made of extruded articles.

16. The joining structure for joining adjacent members as recited in claim 11, wherein said hollow joining member is made of materials softer than the materials of said first and second members.

17. The joining structure for joining adjacent members as recited in claim 11, wherein said first and second members are extruded aluminum or aluminum alloy, wherein said hollow joining member is an extruded aluminum or aluminum alloy softer than said first and second members.

18. The joining structure for joining adjacent members as recited in claim 11, wherein said hollow joining member is a metal spherical member having a penetrated hole for inserting said first and second members.

19. The joining structure for joining adjacent members as recited in claim 11, wherein said protruded portion is formed to have a thickness reducing toward a basal end of said protruded portion, and said dented portion is formed to have a width increasing toward a bottom end of said dented portion.

* * * * *